United States Patent
Ahn et al.

(10) Patent No.: US 10,592,535 B2
(45) Date of Patent: Mar. 17, 2020

(54) DATA FLOW BASED FEATURE VECTOR CLUSTERING

(71) Applicant: Microsoft Technology Licensing, LLC, Redmond, WA (US)

(72) Inventors: Yong-Yeol Ahn, Bloomington, IN (US); Azadeh Nematzadeh Chekuvar, Bloomington, IN (US); Ian Benjamin Wood, Bloomington, IN (US); Jaehyuk Park, Bloomington, IN (US); Yizhi Jing, Bloomington, IN (US); Michael David Conover, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 15/229,956

(22) Filed: Aug. 5, 2016

(65) Prior Publication Data
US 2018/0039688 A1      Feb. 8, 2018

(51) Int. Cl.
*G06F 16/2457*      (2019.01)
*G06F 16/28*      (2019.01)
(Continued)

(52) U.S. Cl.
CPC ...... *G06F 16/285* (2019.01); *G06F 16/24575* (2019.01); *G06F 16/24578* (2019.01);
(Continued)

(58) Field of Classification Search
CPC ......... G06F 17/30601; G06F 17/30958; G06F 16/9535; G06F 16/9024; G06F 16/435;
(Continued)

(56) References Cited

U.S. PATENT DOCUMENTS 8,805,845 B1 *   8/2014   Li ..................... G06F 17/30958
                                                              707/738
9,569,729 B1 *   2/2017   Oehrle ................. G06Q 10/063
(Continued)

OTHER PUBLICATIONS

Dobrynin et al., "Contextual Document Clustering", 2004, Springer-Verlag. (Year: 2004).*

(Continued)

*Primary Examiner* — Apu M Mofiz
*Assistant Examiner* — Sheryl L Holland
(74) *Attorney, Agent, or Firm* — Schwegman Lundberg & Woessner, P.A.

(57) ABSTRACT

Methods and systems for generating tailored user interface presentations based on microindustry clustering. According to various embodiments, the system accesses a set of entity profiles and a set of member profiles. The system determines a set of feature vectors for each entity of the set of entity profiles and identifies a set of movement data representing changes in association of one or more members from a first entity to a second entity. The system generates an entity graph for the set of entities and the set of members. The systems generate a first set of clusters in the entity graph, a second set of clusters by partitioning one or more of the first clusters, and a set of third clusters from the set of second clusters, combining one or more of the second clusters.

20 Claims, 8 Drawing Sheets

(51) Int. Cl.
  *H04L 29/08* (2006.01)
  *G06F 16/901* (2019.01)
  *G06F 16/9535* (2019.01)
  *G06Q 50/00* (2012.01)
  *G06Q 30/02* (2012.01)
(52) U.S. Cl.
  CPC ...... *G06F 16/9024* (2019.01); *G06F 16/9535* (2019.01); *G06Q 30/0251* (2013.01); *G06Q 50/01* (2013.01); *H04L 67/306* (2013.01)
(58) Field of Classification Search
  CPC .......... G06F 16/2457; G06F 16/24575; G06F 16/9035
  See application file for complete search history.

(56) References Cited

U.S. PATENT DOCUMENTS

| | | | | |
|---|---|---|---|---|
| 9,798,789 | B2* | 10/2017 | Lindstrom | G06F 17/30569 |
| 10,068,032 | B2* | 9/2018 | Nigam | G06F 17/30336 |
| 2009/0024549 | A1* | 1/2009 | Johnson | H04L 43/00 |
| | | | | 706/46 |
| 2011/0013837 | A1* | 1/2011 | Bergman | G06T 7/11 |
| | | | | 382/173 |
| 2012/0102130 | A1* | 4/2012 | Guyot | H04L 51/12 |
| | | | | 709/206 |
| 2012/0197733 | A1* | 8/2012 | Skomoroch | G06Q 30/02 |
| | | | | 705/14.66 |
| 2013/0030875 | A1* | 1/2013 | Lee | G06Q 10/06311 |
| | | | | 705/7.38 |
| 2013/0191416 | A1* | 7/2013 | Lee | G06F 17/30979 |
| | | | | 707/771 |
| 2013/0325945 | A1* | 12/2013 | Jayaram | H04L 51/32 |
| | | | | 709/204 |
| 2014/0066044 | A1* | 3/2014 | Ramnani | H04W 8/24 |
| | | | | 455/418 |
| 2014/0143164 | A1* | 5/2014 | Posse | G06Q 10/105 |
| | | | | 705/319 |
| 2016/0132800 | A1* | 5/2016 | Davar | G06Q 10/0637 |
| | | | | 705/7.36 |
| 2016/0269554 | A1* | 9/2016 | Cecchi | H04M 3/4936 |
| 2017/0032322 | A1* | 2/2017 | Grover | G06Q 10/1053 |

OTHER PUBLICATIONS

Jiang et al., "Analyzing Firm-Specific Social Media and Market: A Stakeholder-based event analysis framework", Jun. 18, 2013, Elsevier. (Year: 2013).*

* cited by examiner

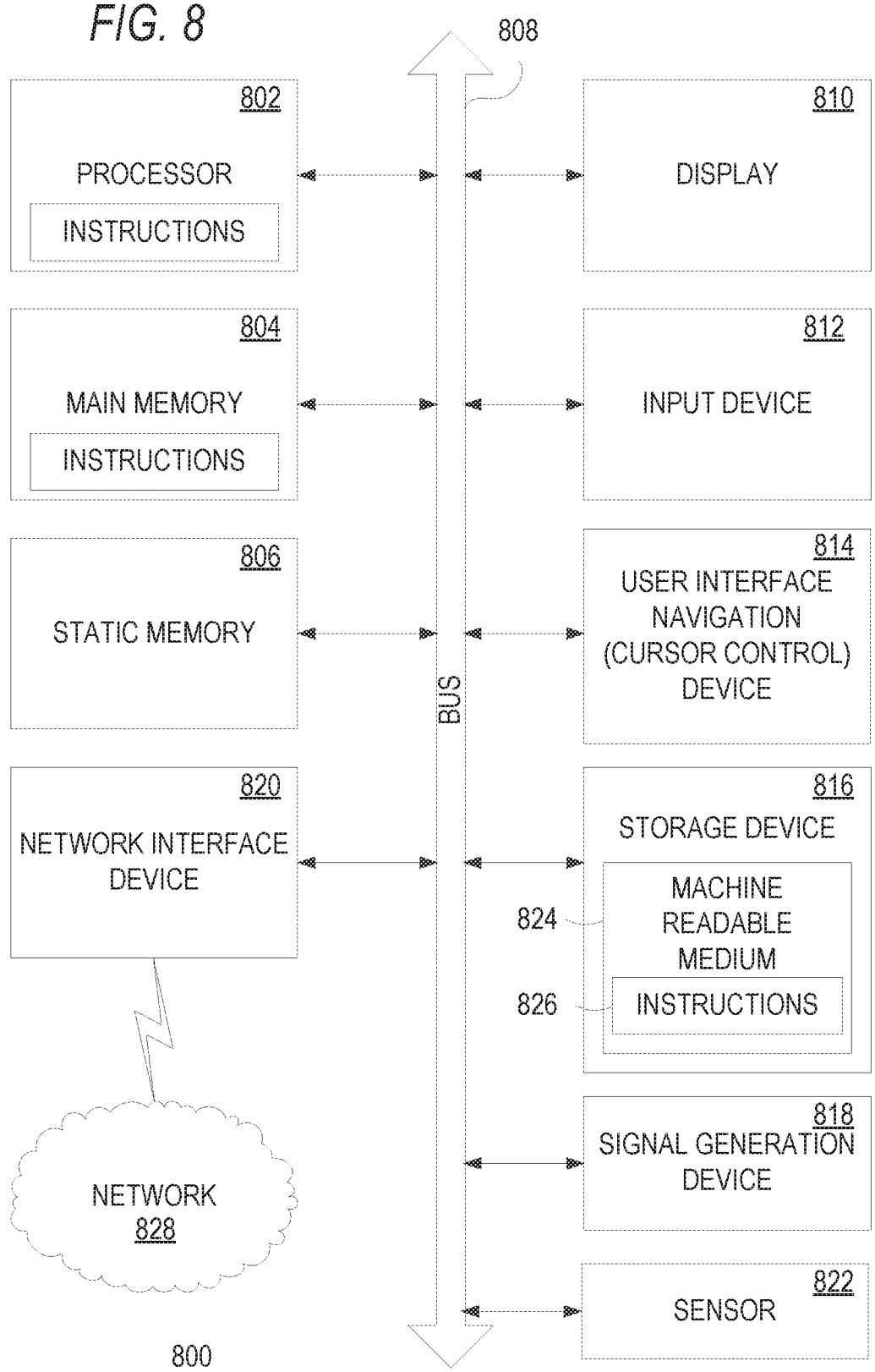

DATA FLOW BASED FEATURE VECTOR CLUSTERING

TECHNICAL FIELD

The present disclosure generally relates to the technical field of social-networking systems and, in one embodiment, to analyzing social network data to generate microindustry clusters to generate and present tailored user interface presentations.

BACKGROUND

A social networking system, such as LinkedIn, may allow members to declare information about themselves, such as their professional qualifications or skills. In addition to information the members declare about themselves, a social networking system may gather and track information pertaining to behaviors of members with respect to the social networking system and social networks of members of the social networking system. Analyzing a vast array of such information may help to come up with solutions to various problems that may not otherwise have clear solutions.

BRIEF DESCRIPTION OF THE SEVERAL VIEWS OF THE DRAWINGS

Some embodiments are illustrated by way of example and not limitation in the accompanying drawings, in which:

FIG. 8 is a block diagram of a machine in the form of a computing device within which a set of instructions, for causing the machine to perform any one or more of the methodologies discussed herein, may be executed.

DETAILED DESCRIPTION

Figure 1:
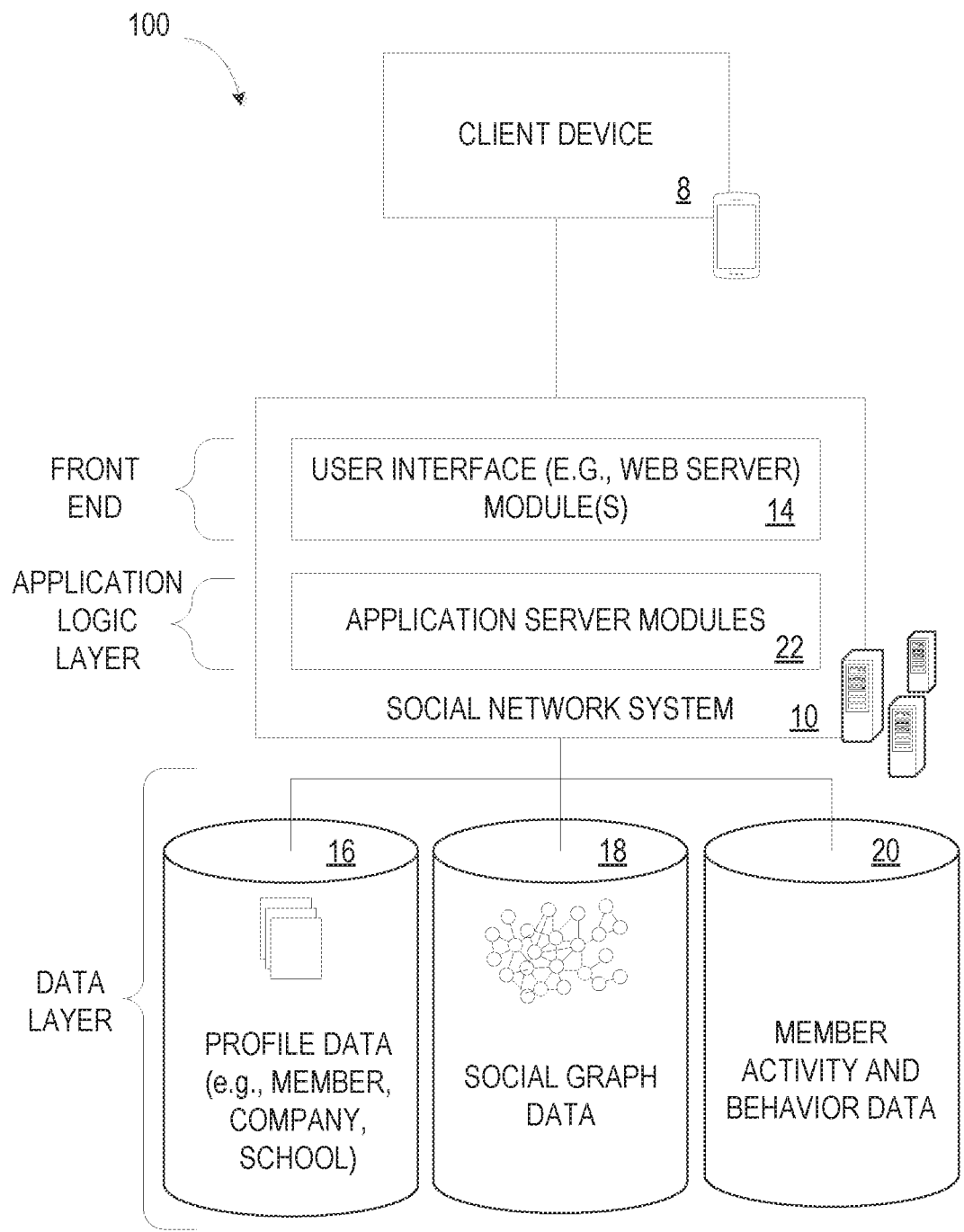
FIG. 1 is a block diagram of the functional modules or components that comprise a computer-network based social network service, including a skills clustering machine consistent with some embodiments described herein.

Example methods and systems for automatically clusters representing microindustries for use in generating tailored user interface presentations are described. Methods and systems described herein may increase visibility of entity profiles of a social networking system in search results on the social networking system or other search engines operating on a network such as the Internet. As described in more detail below, the methods and systems of the present disclosure may enable increases in visibility of entities based on interrelations of entity profile and member profiles where the data was previously unavailable. For example, based on a makeup and interactions of the members and entities of the social networking system, methods and systems described herein may identify previously undetected similarities and automatically generate new data or modify data of the social network system in order to facilitate identification in search results or mining of data. In some instances, the associations among the member profiles may be associations of which members of the social networking system may be unaware and had not previously indicated within their member profile. Further, systems and methods of the present disclosure may generate tailored user interface presentations, such as graphical and textual representations of microindustry clusters, member profiles, entity profiles, and interrelations among the member profiles and entity profiles. In the following description, for purposes of explanation, numerous specific details are set forth in order to provide a thorough understanding of example embodiments. It will be evident, however, to one skilled in the art that the embodiments of the present disclosure may be practiced without these specific details.

Social networking services provide various profile options and services. In some instances a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system and companies maintaining a social networking presence on the social networking system. As will be discussed in more detail below, information pertaining to members of the social networking system can include data items pertaining to education, work experience, skills, reputation, certifications, or other qualifications of each of the members of the social networking system and at particular points during the careers of these members. This information pertaining to members of the social networking system may be member generated to enable individualization of social networking profiles as well as to enable dynamic and organic expansion and discovery of fields of experience, education, skills, and other information relating to personal and professional experiences of members of the social networking system.

Other aspects of the present inventive subject matter will be readily apparent from the description of the figures that follow.

FIG. 1 is a block diagram of the functional modules or components that comprise a computer- or network-based social networking system 10 consistent with some embodiments of the inventive concepts of the present disclosure. As shown in FIG. 1, the social networking system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions (e.g., an instruction set executable by a processor) and the corresponding hardware (e.g., memory and processor) for executing the instructions. To avoid obscuring the inventive subject matter, various functional modules and engines that are not germane to conveying an understanding of the inventive subject matter have been omitted from FIG. 1. However, a skilled artisan will readily recognize that various additional functional modules and engines may be used with a social networking system 10, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end comprises a user interface module 14 (e.g., a web server), which receives requests from various client-computing devices 8, and communicates appropriate responses to the requesting client devices 8. For example, the user interface module 14 may receive requests in the form of Hypertext Transport Protocol (HTTP) requests, or other web-based, application programming interface (API) requests. The client devices 8 may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may use a bi-lateral agreement by the members, such that both members acknowledge the establishment of the connection. Similarly, with some embodiments, a member may elect to "follow" another member. In contrast to establishing a "connection", the concept of "following" another member typically is a uni-lateral operation, and at least with some embodiments, does not include acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules, which, in conjunction with the user interface module 14, generates various user interfaces (e.g., web pages) with data retrieved from various data sources in the data layer. With some embodiments, individual application server modules are used to implement the functionality associated with various applications, services and features of the social network service. For instance, a messaging application, such as an email application, an instant messaging application, a social networking application native to a mobile device, a social networking application installed on a mobile device, or some hybrid or variation of these, may be implemented with one or more application server modules implemented as a combination of hardware and software elements. Of course, other applications or services may be separately embodied in their own application server modules.

As shown in FIG. 1, a clustering machine 22 is an example application server module of the social networking system 10. The clustering machine 22 performs operations to automatically generate clusters, identifying interrelations between entities and members having profiles on the social network system 10. In some embodiments, the clustering machine 22 operates in conjunction with the user interface modules 14 to receive member input and generate tailored user interface presentations based on the clusters representing microindustries. For example, the clustering machine 22 may generate graphical representations of clusters and inter-relations of the clusters (e.g., members and entities within the clusters) representing predictions, advertisements, and parameterized manipulation of the clusters. The clustering machine 22 may also cause presentation of other information relating to the identified set of member profiles, as will be explained in more detail below.

The social networking system 10 may provide a broad range of applications and services that allow members the opportunity to share and receive information, often customized to the interests of the member. For example, with some embodiments, the social networking system 10 may include a photo sharing application that allows members to upload and share photos with other members. As such, at least with some embodiments, a photograph may be a property or entity included within a social graph. With some embodiments, members of a social networking system 10 may be able to self-organize into groups, or interest groups, organized around a subject matter or topic of interest. Accordingly, the data for a group may be stored in a database (not shown), When a member joins a group, his or her membership in the group will be reflected in the social graph data stored in the database 18. With some embodiments, members may subscribe to or join groups affiliated with one or more companies. For instance, with some embodiments, members of the social networking system 10 may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database 18.

Figure 2:
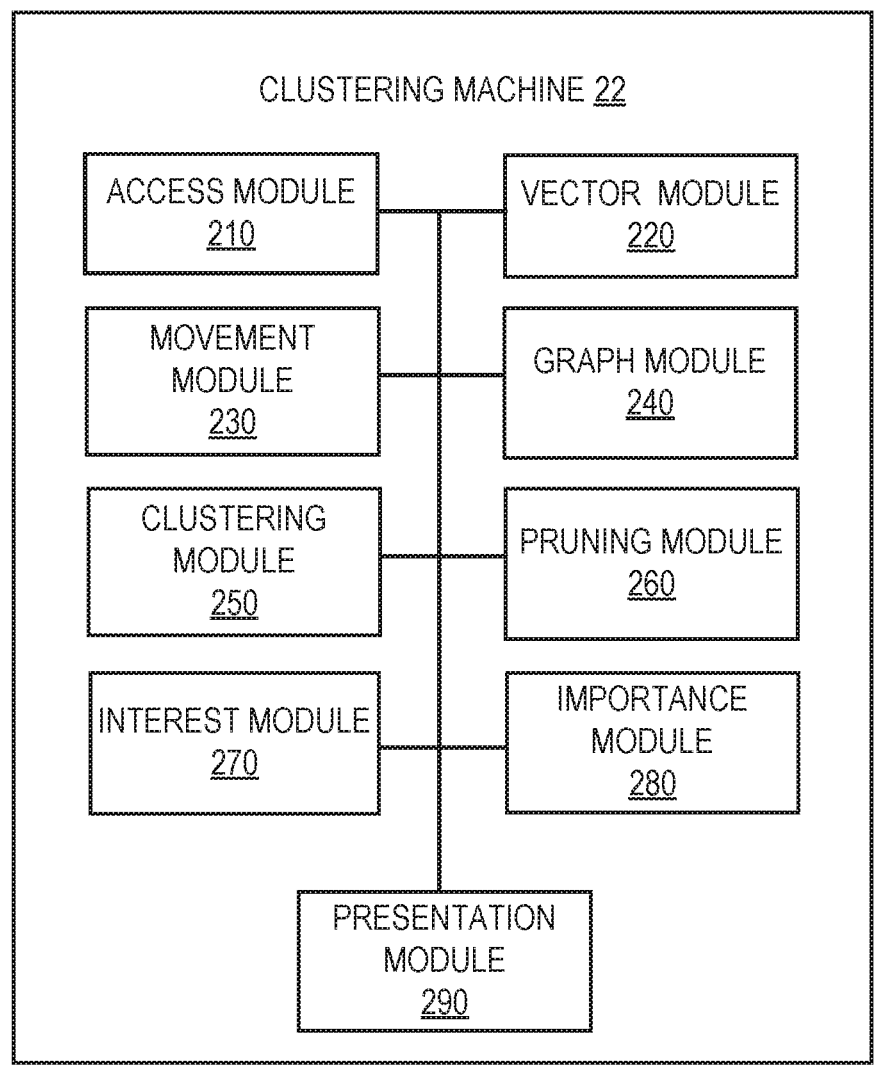
FIG. 2 is a block diagram depicting some example modules of the clustering machine of FIG. 1.

FIG. 2 is a block diagram depicting some example modules of the clustering machine 22 of FIG. 1. The clustering machine 22 is shown including an access module 210, a vector module 220, a movement module 230, a graph module 240, a clustering module 250, a pruning module 260, an interest module 270, an importance module 280, and a presentation module 290 all configured to communicate with each other (e.g., via a bus, shared memory, a switch, or a network). Any one or more of the modules described herein may be implemented using hardware (e.g., one or more processors specifically configured to perform the operations described herein) or a combination of hardware and software, forming a hardware-software implemented module. For example, any module described herein may configure a processor (e.g., among one or more processors of a machine) as a special purpose machine, during the pendency of a set of operations, to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The access module 210 accesses sets of social network data on the social network system 10. In various example embodiments, the access module 210 accesses a set of member profiles of the social networking system 10 to access attributes of the member profiles. The access module 210 accesses a set of entity profiles to access attributes of the entity profiles indicating features of the entity or an industry attributable to the entity. In some embodiments, the access module 210 accesses the sets of social network data via a network connection between the social networking system 10 and the clustering machine 22, where the clustering machine 22 is implemented in a standalone or otherwise networked relationship to the social networking system 10.

The vector module 220 generates vectors based on information contained within the sets of data of the social network system 10. In some embodiments, the vector module 220 generates profile feature vectors based on attributes, skills, employment history, and other pertinent data stored within or associated with member profiles of the social network system 10. The vector module 220 may also generate feature vectors for entities, clusters, job openings, and other data sets. As described below, the vector module 220 may generate feature vectors based on interrelations of data within a given profile or interrelations of profiles of differing types and clusters.

The movement module 230 identifies movement data represented in sets of member profiles. In some instances, the movement data may indicate a change of association of a member of the social network system 10 between a first entity and a second entity. The movement data may be indicated by a change or modification of member profiles indicating a new current employer, or other changes of association. In some instances, the movement module 230 identifies movement data in response to an update or change indication from the social network system 10 responsive to changes in member profiles. In some instances, the movement module 230 monitors the sets of social network data to identify changes of association. The monitoring may be continuous or may be periodic, in some embodiments.

The graph module 240 generates graphs from the sets of social network data 10. In some instances, the graph module 240 generates an entity graph including nodes and edges. The nodes represent entities and the edges represent movement data between two or more entities. In some embodiments, the entity graph may be generated as a graphical (e.g., a visual) representation of the set of entities and movement data. In some embodiments, the entity graph may be generated as a data structure from which one or more modules of the present disclosure may generate clusters to identify microindustries.

The clustering module 250 generates clusters from nodes of the graphs generated by the graph module 240. In some embodiments, the clustering module 250 generates a set of first clusters and a set of third clusters. The clusters generated by the clustering module 250 may be generated based on movement data, vectors generated by the vector module 220, and other interrelations of the set of social network data. In some embodiments, the clustering module 250 may determine and apply weighting to one or more clusters, edges, or nodes.

The pruning module 260 generates sets of third clusters from the sets of first clusters, and sets of second clusters. In some instances, the pruning module 260 may generate or organize the graphs of the graph module 240 into a dendrogram. The pruning module 260 may generate the set of third clusters based on the dendrogram structure and interrelation of entities forming the set of second clusters.

The interest module 270 identifies interest values for members of the social network system 10. The interest values may quantify levels of interest of members in an entity or microindustry (e.g., a specified cluster). The interest module may identify interest values based on vectors generated from the profile, history, and interactions of the member.

The importance module 280 may compute a status of an entity in a graph. For example, the status of the entity may be determined by node degree techniques, views the entity received on a website, search engine referral traffic, network centrality calculations, or other suitable algorithms. In some embodiments, the network centrality calculations may include betweenness centrality or an eigenvector centrality. The importance module 280 may determine importance scores indicative of the status of the entity.

The presentation module 290 causes presentation of data representing one or more entities, members, and microindustries. The presentation module 290 may cause presentations of the representative data in graphical representations, textual representations, or other audio/visual representations. In some embodiments, causing presentation of the representative data includes transmitting the representative data to a client device (e.g., the client device 8) via a network connection. In some instances, the representative data may be presented by rendering the data on a display device associated with the client device.

Figure 3:
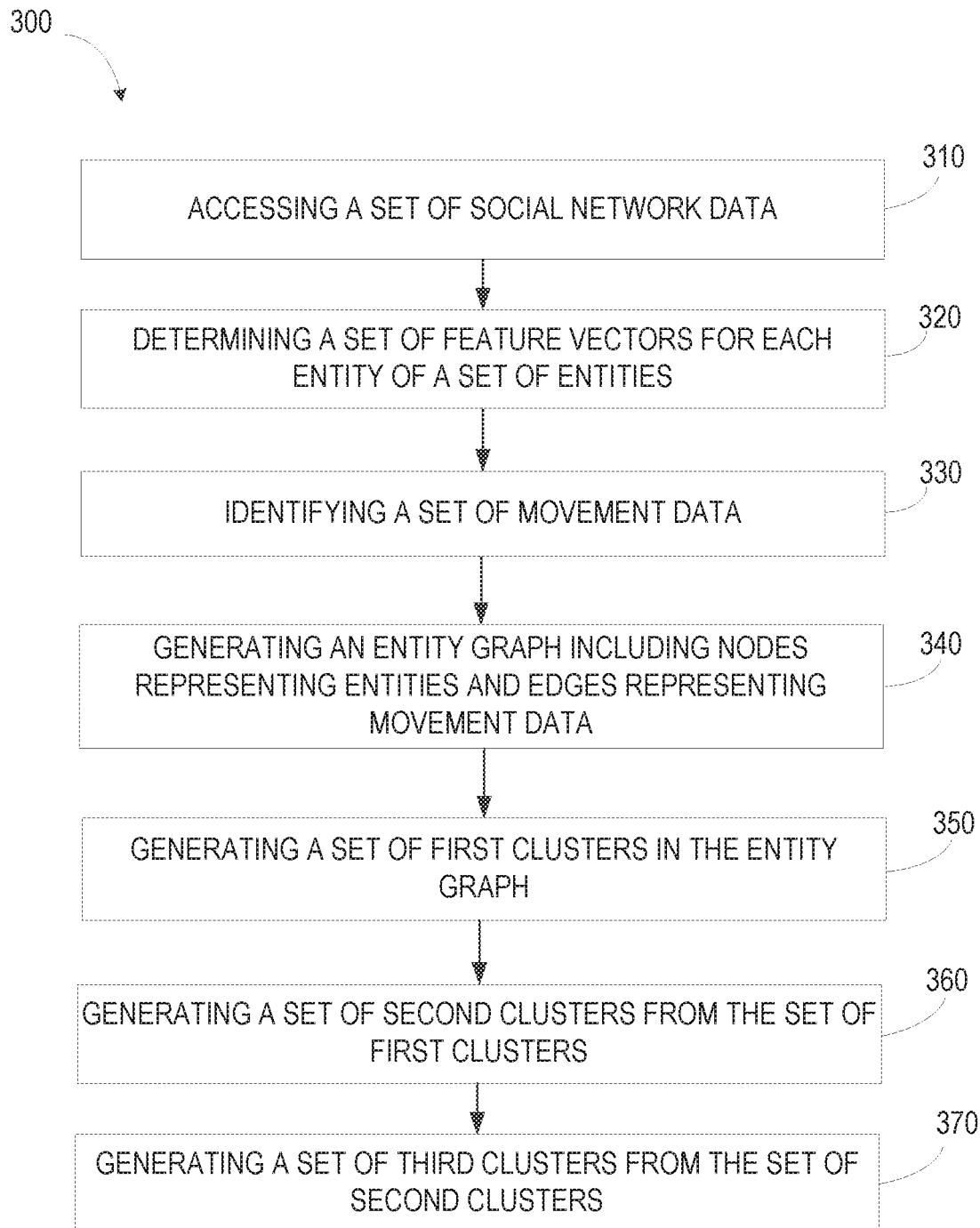
FIG. 3 is a flow diagram illustrating an example method of generating entity clusters and graphical representation to identify microindustries within a set of entity profiles of a social network system, according to some embodiments of the present disclosure.

FIG. 3 is a flow diagram illustrating an example method 300 of generating entity clusters and graphical representation to identify microindustries within a set of entity profiles of a social network system, consistent with various embodiments described herein. The method 300 may be performed at least in part by, for example, the clustering machine 22 illustrated in FIG. 2 (or an apparatus having similar modules or operative programming, such as one or more client machines or application servers).

In operation 310, the access module 210 accesses a set of social network data on a social network system 10. The set of social network data may include a set of entity profiles and a set of user profiles. Each entity profile may have one or more associated user profiles. The access module 210 may access the set of social network data on a database of the social network system 10. Where the clustering machine 22 and the database (e.g., the database 16 and the database 18) are part of the social network system 10, the access module 210 may access the database (e.g., database 16 and database 18) directly to retrieve or otherwise access the set of social network data. In some embodiments, where the database is part of a system other than the social network system 10 or is remove from the clustering machine 22, the access module 210 accesses the set of social network data on the database by transmitting a request for at least a portion of the set of social network data and receiving at least a portion of the set of social network data (e.g., a set of user profiles and a set of entity profiles) or data representing associations among user profiles and entity profiles via a network (e.g., the internet).

The set of entity profiles may include information relating to an entity or organization such as a company, a non-profit organization, a government agency, a non-governmental agency, a charity, or any other entity. Entity profiles may include titles, locations (e.g., headquarter locations and service areas or locations), mission statements, descriptions of products, descriptions of services, descriptions of technology fields, descriptions of an industry, and other suitable information relating to the entity.

The set of user profiles may include member generated titles (e.g., job titles, honorary titles, educational titles), locations, descriptions of job history, member generated skills and corresponding descriptions, descriptions of education, and other information pertinent to the user. For example, a user may generate a user profile in the form of an expanded resume or curriculum vitae. Descriptions of job history may include current employers, previous employers, job titles, employment duties, employment duration, dates of employment, and any other suitable information relating to employment.

In operation 320, the vector module 220 determines a set of feature vectors for each entity of the set of entity profiles. The set of feature vectors may represent an attribute of the associated user profiles. The set of feature vectors may represent a number of employees of an entity "A" who are members of the social network system 10 and share a region, industry, skill, seniority, job title, followed publishers, or any other suitable attribute capable of being represented within a user profile on the social network system 10. Feature vectors may be stored in a data structure such as a table or array, and determined by the vector module 220 based on access of the data structure. For example, feature vectors may be defined in a cell in a data structure (e.g., a table or an array) associated with a specified entity. An entity may have an entity feature vector or a set of entity feature vectors within the data structure. For example, for an entity A, an entity feature vector "V" may be defined in a cell "$V_i$" representing a number of members of the social network system 10 who declare a given or specified attribute on a user profile, where the user profile is associated with the entity. In this example, the cell $V_i$ may be a region attribute (e.g., a location of a member associated with the entity) corresponding to a proportion of employees of entity A who live in the San Francisco Bay Area. Another cell "$V_{i2}$" may correspond to a number of employees of entity A who live in Shenzen, China.

In some embodiments, the set of feature vectors for an entity may be determined using one or more sub-operations of the operation 320. In some instances, the vector module 220 identifies one or more attributes specified in one or more user profiles of the set of user profiles associated with the entity. The identification of the one or more attributes may be used to populate the data structure containing feature vectors.

The vector module 220 determines a proportion of user profiles including each of the one or more attributes. In some embodiments, feature vectors represent proportions of members having a given attribute within a user profile. In generating the data structure, the vector module 220 may determine the proportion of user profiles for a given attribute based on a total number of user profiles associated (e.g., currently associated) with the entity and a number of user profiles which include the given attribute.

The vector module 220 generates a data structure associated with the entity indicating the one or more attributes and a value indicating, for each attribute of the one or more attributes, a proportion of the user profiles associated with the entity including the attribute. In some embodiments, the data structure includes a plurality of values for each attribute. For example, the data structure may include a raw number of user profiles associated with the entity which include a given attribute and a proportion of user profiles including the attribute. The vector module 220 may continually update the data structure based on input from the movement module 230, described below.

In operation 330, the movement module 230 identifies a set of movement data representing a change of association of one or more users of the set of user profiles. The change of association may be from a first entity to a second entity of the set of entity profiles. For example, where the user profile is an online resume on the social network system 10, the change of association may represent a change in current employment from a first organization to a second organization. The movement module 230 may identify the set of movement data within the set of user profiles by parsing employment history and employment dates included within the set of user profiles. The movement module 230 may initially generate the set of movement data based on employment history provided within user profiles of the social network system 10 and update the set of movement data as subsequent changes of association occur within the social network system 10. In some embodiments, the movement module 230 may periodically parse or crawl the set of user profiles to update the set of movement data. Movement data may also be passed to the movement module 230 from the social network system 10 in response to updates of individual user profiles within the social network system 10.

In operation 340, the graph module 240 generates an entity graph including a set of nodes and a set of edges. Each node of the set of nodes may represent an entity. The set of edges may represent movement data of one or more users changing associations between nodes (e.g., entities of the set of entities). The graph may be defined in terms of nodes "N" and edges "E." Each entity may be represented by a node within the graph, such as $N_i$ or $N_j$. Each edge extending between two entities may be represented by an edge within the graph, such as $E_{ij}$, designating that the edge extends between nodes $N_i$ and $N_j$.

In operation 350, the clustering module 250 generates a set of first clusters in the entity graph. The set of first clusters may be identified based on the set of feature vectors of the set of entity profiles. In some embodiments, the clustering module 250 may generate the first set of clusters in the entity graph based on the set of movement data, to define clusters which have more edges between nodes who are members of the cluster than edges to nodes who are not members of the cluster. In some instances, the clustering module 250 may initially use operations of Louvian fast modularity maximization, InfoMap, or label propagation algorithms. The set of first clusters may form a mapping of nodes into clusters which are empirically demonstrated to correspond to meaningful modules of interest.

In some embodiments, the clustering module 250 generates the set of first clusters by performing one or more sub-operations as part of the operation 350. In some instances, the clustering module 250 generates a weight for an edge extending between a first node and a second node based on movement data of the set of movement data between the first node and the second node. In these instances, the clustering module may generate a weight for each edge of the graph. Using the example described above with an edge $E_{ij}$ extending between nodes $N_i$ and $N_j$, the clustering module 250 may generate a weight $w_{ij}$. The weight $w_{ij}$ may correspond to the total number of people moving from node $N_i$ to $N_j$.

The clustering module 250 may normalize the weight for the edge based on movement data associated with one or more edges extending between the first node and a set of neighboring nodes. Using the example outlined above for the weight $w_{ij}$, the clustering module 250 may normalize the weights for the edges using transformations such as strength. In these instances, the normalization may be generated as $s_{ij}$, where $s_{ij}$ equals the weight, $w_{ij}$, divided by a sum of the weights for edges extending between node $N_i$ and a set of neighboring nodes directly connected by a single edge to node $N_i$.

In operation 360, the clustering module 250 generates a set of second clusters by partitioning one or more of the first clusters of the set of first clusters. In some embodiments, generating the set of second clusters may be a reclustering of one or more clusters of the set of first clusters. In some instances, the reclustering may use a force-directed layout algorithm to yield meaningful sub-cluster structures. As described below, with respect to FIG. 7, in some embodiments, the clustering module 250 may generate the set of second clusters based on a predetermined cluster size and based on the feature vectors of entities present within one or more first clusters of the set of first clusters.

In operation 370, the pruning module 260 generates a set of third clusters from the set of second clusters. The set of third clusters may combine one or more of the second clusters of the set of second clusters. The pruning module 260 may generate the set of third clusters based on a dendrogram (e.g., a tree structure) generated for the set of first clusters and the set of second clusters. Although described with respect to the set of third clusters, the recursive clustering is not limited to the depth of the set of third clusters. In some embodiments, the recursive clustering may produce a tree of arbitrary depth of 1 . . . N sets of clusters. In some instances, the pruning module 260 combines second clusters to address heterogeneity in cluster size resulting from the operations of the clustering module 250, described above. The pruning module 260 may preserve second clusters which are intrinsically semantically related within a predetermined threshold (e.g., semantically meaningful). A combination of second clusters of the set of second clusters and the set of third clusters, generated by the pruning module 260, may represent a fine-grained partitioning of entities into clusters of topically or geospatially related organizations forming a microindustry. In some instances, a microindustry may be understood as a set of highly-related organizations within a larger industry, economic sector, or geographic region.

In some embodiments, as will be described in more detail below, the pruning module 260 may generate a set of clusters based on pruning of certain clusters from a previous set. The pruning module 260 may use information gain from splitting a parent cluster into two constituent children. The information gain may be determined based on how much uncertainty is reduced (Shannon entropy) by splitting the constituent children. The pruning module 260 may average across the information gains between each child/parent pair for a given parent. The averaging of information gain enables the pruning module 260 to define a statistic capturing the amount learned from splitting the cluster. The pruning module 260 may split clusters where the statistic exceeds a predetermined threshold.

Figure 4:
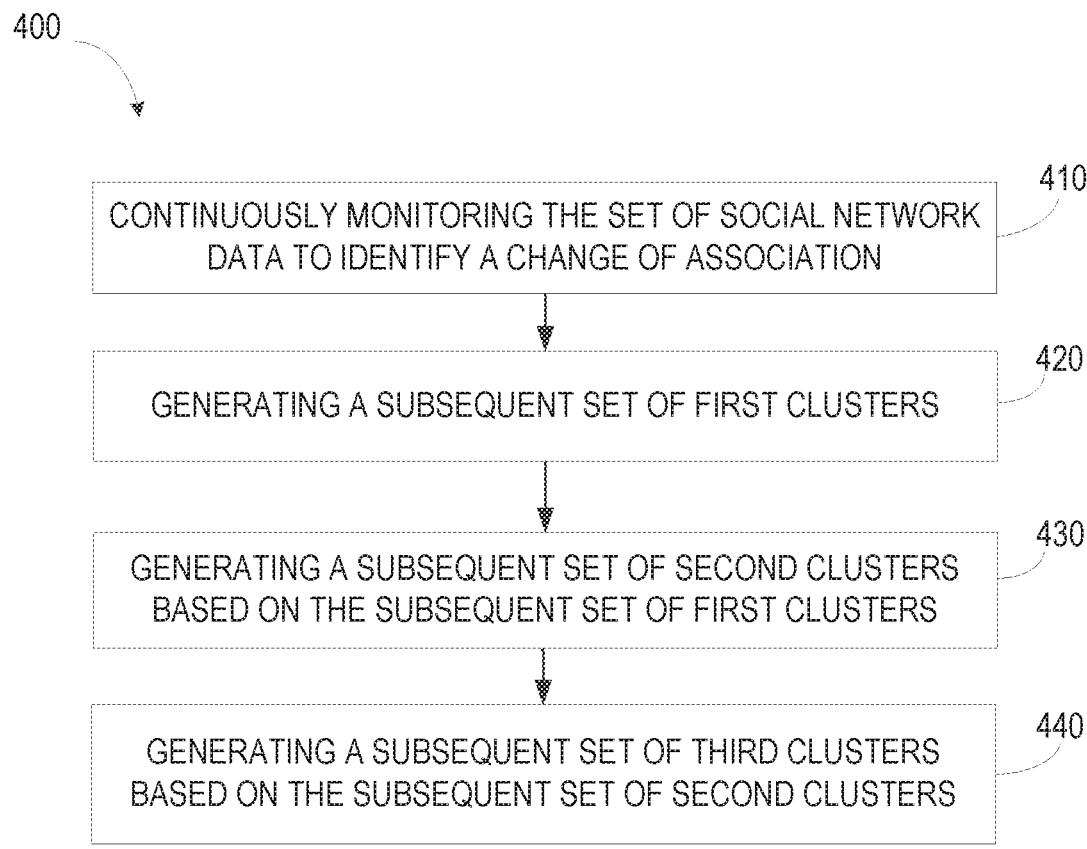
FIG. 4 is a flow diagram illustrating an example method of generating entity clusters and graphical representation to identify microindustries within a set of entity profiles of a social network system, according to some embodiments of the present disclosure.

FIG. 4 is a flow diagram illustrating an example method 400 of generating entity clusters and graphical representation to identify microindustries within a set of entity profiles of a social network system, consistent with various embodiments described herein. The method 400 may be performed at least in part by, for example, the clustering machine 22 illustrated in FIG. 2 (or an apparatus having similar modules, such as one or more client machines or application servers). In some embodiments, the method 400 includes one or more operations from the method 300. In some instances, as shown in FIG. 4, the method 400 is performed after the operation 370. The method 400 may also be performed in response to the operation 330.

In operation 410, the movement module 230 continuously monitors the set of social network data to identify the change of association, within one or more user profiles of the set of user profiles, from the first entity to the second entity. In some embodiments, the change of association of the operation 410 may be a first change of association. The movement module 230 may continuously monitor the set of social network data by periodic access of the social network data directly or via a network. For example, the periodic access may be performed as predetermined time intervals or based on one or more events identified within the social network data or the social network system 10. An event may be a change in the set of social network data sufficient to cause a change in a set of user profiles above a predetermined threshold. For example, a merger of two entities or a dissolution of an entity causing a change of association of a number of members of the social network system 10 may cause the movement module 230 to access the social network data and identify the change of association.

In some instances, continuous monitoring of the set of social network data may be performed by periodic or continuous updates from the social network system 10. In these embodiments, the movement module 230 may be understood to be continuously listening for updates from the social network system 10. The social network system 10, upon receiving a user profile update including a change of association, may transmit the change of association to the movement module 230.

In operation 420, in response to a subsequent change of association, the clustering module 250 generates a subsequent set of first clusters in the entity graph based on the subsequent change of association. The subsequent set of first clusters may be generated similarly to or the same as the operation 350. The operation 420 may be performed using the updated or subsequent change of association, thereby modifying a position of one or more entities within the subsequent set of first clusters from an initial position of the one or more entities within the set of first clusters generated in the operation 350.

In operation 430, the clustering module 250 generates a subsequent set of second clusters based on the subsequent set of first clusters. The subsequent set of second clusters may be generated similarly to or the same as the operation 360. The operation 430 may be performed using the subsequent set of first clusters, modifying a placement of one or more entity in the subsequent set of second clusters from an initial position within the set of second clusters. In some instances, generation of the subsequent set of second clusters may generate new second clusters not previously generated in the operation 360.

In operation 440, the pruning module 260 generates a subsequent set of third clusters based on the subsequent set of second clusters. Although described with respect to the pruning module 260, in some embodiments, the generation of the set of third clusters may be performed in part or in whole by the clustering module 250. The operation 440 may be performed similarly to or the same as the operation 370. In some embodiments, the operation 440 causes generation of new third clusters not previously generated in the operation 370. The subsequent set of third clusters may similarly remove a third cluster previously generated in the operation 370.

Figure 5:
FIG. 5 is a flow diagram illustrating an example method of generating entity clusters and graphical representation to identify microindustries within a set of entity profiles of a social network system, according to some embodiments of the present disclosure.

FIG. 5 is a flow diagram illustrating an example method 500 of generating entity clusters and graphical representation to identify microindustries within a set of entity profiles of a social network system, consistent with various embodiments described herein. The method 500 may be performed at least in part by, for example, the clustering machine 22 illustrated in FIG. 2 (or an apparatus having similar modules, such as one or more client machines or application servers). In some embodiments, the method 500 includes one or more operations from the method 300. For example, as shown, the method 500 includes operations 310-350. The operations of the method 500 may be performed during or as a set of sub-operations of one or more operations of the method 300. As shown in FIG. 5, the operations of the method 500 are performed as sub-operations of the operation 360.

In operation 510, the clustering module 250 determines a cluster threshold of a specified number of entities for a cluster. In some instances, the cluster threshold may be determined based on one or more of the attributes or feature vectors, a size of one or more first clusters of the set of first clusters, a size of a region, or any other suitable characteristic of the social network data. In some embodiments, the size of a region may be a radius of gyration describing the geospatial concentration of a set of points. The radius of gyration may enable the clustering module 250 or the pruning module 260 to prune or form clusters based on geospatial concentrations.

In operation 520, the clustering module 250 identifies a number of entities within each cluster of the set of first clusters. In some instances, the clustering module 250 may identify the number of entities within each first cluster by parsing the set of first clusters. In some instances, a data structure may be generated by the clustering module 250 representing each first cluster of the set of first clusters and indicating a number of entities associated with each first cluster.

In operation 530, the clustering module 250 determines whether the number of entities of each cluster of the set of first clusters exceeds the cluster threshold. In some instances, upon determining the number of entities of the first cluster exceeds the cluster threshold, the clustering module 250 initiates one or more operations to split the first cluster into two clusters of the set of second clusters. In some embodiments, where the number of entities of a first cluster exceeds the cluster threshold, the clustering module 250 may mark the first cluster at issue for division. Upon marking a first cluster for division, the clustering module 250 may parse each of the first clusters remaining in the set of first clusters prior to splitting any specified first cluster.

In operation 540, for each entity, the vector module 220 identifies an entity feature vector selected from the set of feature vectors. In some embodiments, the entity feature vector may be a consolidated feature vector based on the feature vectors identified for a given entity. The vector module 220 may identify a set of entity features vectors to represent an entity in generating the set of second clusters. In some embodiments, the set of entity features may include an entity feature included in the highest proportion of user profiles associated with the entity for a given category. For example, where the categories include a region (e.g., a geographic location), an industry, and a skill, the vector module 220 may identify three entity feature vectors. In this example, the vector module 220 may identify San Francisco Bay Area as the region entity feature vector, based on a higher proportion of user profiles associated with the entity listing San Francisco Bay Area as a geographic location for the user profile. Similarly, the vector module 220 may select software and JAVA®, respectively, as the industry and skill entity feature vectors, based on the respective proportions of inclusion in user profiles.

In some embodiments, the entity feature vector may be identified based on a parameterization of the clustering process (e.g., the method 300, the method 600, or the method 500). For example, where the operation is being performed to identify clusters based on a region, the entity feature vector may be identified based on region attributes for user profiles associated with the entity. The identified entity feature vector may be an attribute included in a highest proportion of user profiles associated with the entity, based on a parameter specified as a basis for generating clusters.

In operation 550, for each first cluster of the set of first clusters, the vector module 220 identifies one or more cluster feature vectors based on proportions of entity feature vectors for the entities included within the set of first clusters. The vector module 220 may parse the entity feature vectors for entities included in a first cluster to identify the one or more cluster feature vectors to determine proportions of the entities having one or more common entity feature vectors. In some embodiments, the vector module 220 where a plurality of cluster feature vectors are identified, the cluster feature vectors may be related (e.g., semantically or geographically related). In some instances, the vector module 220 may determine two or more cluster vectors in the same category have a similar proportion. The proportions of the two or more cluster vectors may be above a predetermined proportion threshold and may trigger segmentation of the given first cluster.

In operation 560, the clustering module 250 segments the set of first clusters into the set of second clusters based on the one or more cluster feature vectors of the first clusters of the set of first clusters. In some embodiments, upon determining two cluster vectors in the same category have a similar proportion which exceeds a predetermined proportion threshold, the clustering module 250 may identify the entities included in each of the respective proportions. The clustering module 250 may split the first cluster into two second clusters containing entities associated with one of the two cluster vectors, respectively. In embodiments where more than two cluster vectors are identified as having similar proportions, the clustering module 250 may subdivide the first cluster into a set of second clusters corresponding to the number of identified cluster vectors.

In some embodiments, after performing the operations 520-560 on each of the first clusters of the set of first clusters and generating the set of second clusters, the clustering module 250 may parse the set of second clusters. The clustering module 250 and the vector module 220 may perform the operations 520-560 on each of the second clusters of the set of second clusters to generate one or more additional second clusters for inclusion in the set of second clusters. In repeating the above-referenced operations, the clustering module 250 and the vector module 220 may generate the set of second clusters where each second cluster is comprised of a set of entities numbering less than the cluster threshold.

Figure 6:
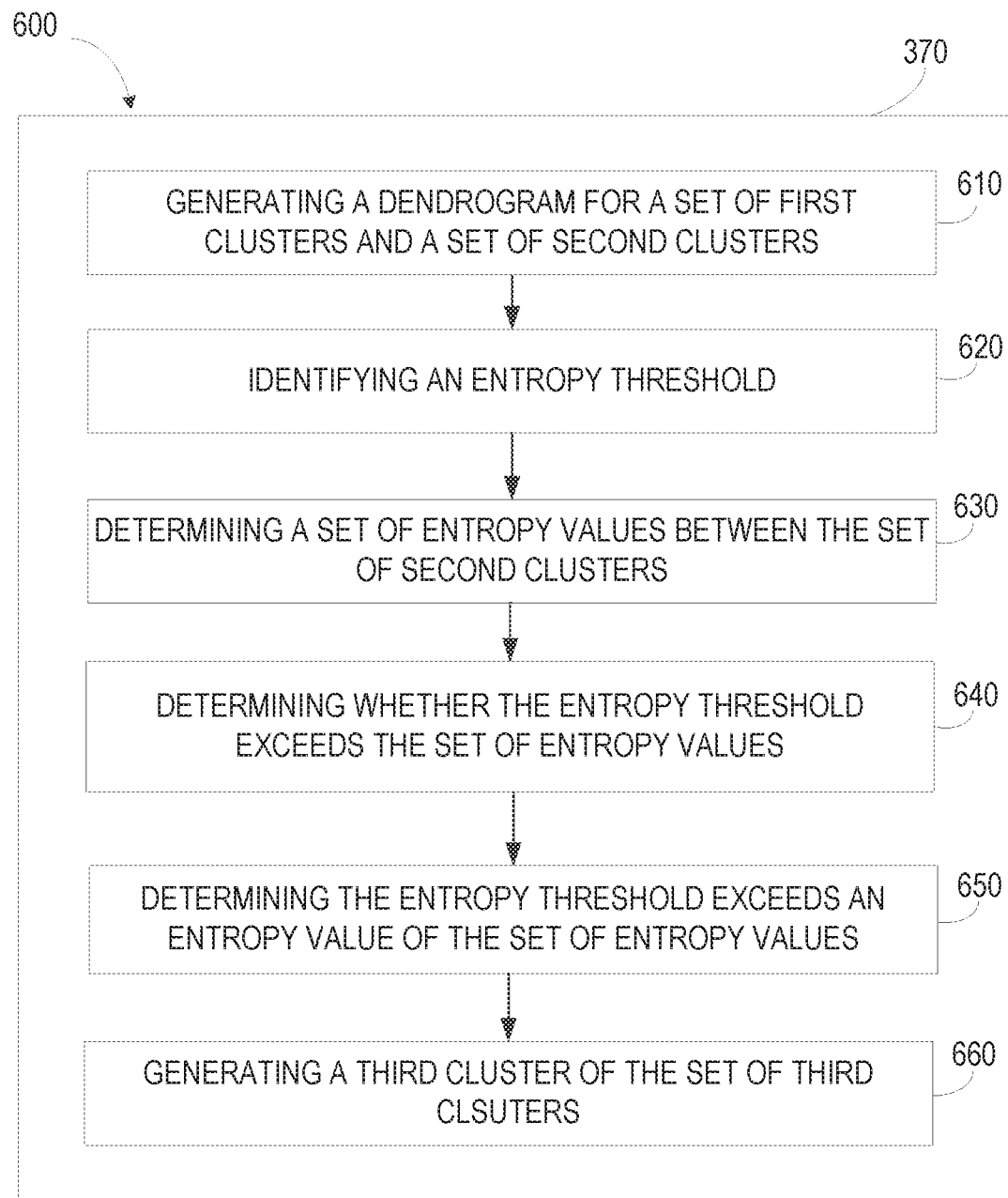
FIG. 6 is a flow diagram illustrating an example method of generating entity clusters and graphical representation to identify microindustries within a set of entity profiles of a social network system, according to some embodiments of the present disclosure.

FIG. 6 is a flow diagram illustrating an example method 600 of generating entity clusters and graphical representation to identify microindustries within a set of entity profiles of a social network system, consistent with various embodiments described herein. The method 600 may be performed at least in part by, for example, the clustering machine 22 illustrated in FIG. 2 (or an apparatus having similar modules, such as one or more client machines or application servers). In some embodiments, the method 600 includes one or more operations from the method 300. For example, as shown, the method 600 includes operations 310-360. The operations of the method 600 may be performed during or as a set of sub-operations of one or more operations of the method 300. As shown in FIG. 6, the operations of the method 600 are performed as sub-operations of the operation 370.

In operation 610, the graph module 240 generates a dendrogram for the set of first clusters and the set of second clusters. The dendrogram may identify one or more clusters of the set of second clusters as subordinate to one or more clusters of the set of first clusters. In some embodiments, the set of first clusters may be identified as parent nodes and each second cluster generated from entities of a first cluster may be identified as child nodes of the first cluster from which the second cluster was generated. Nodes (e.g., entities) within a second cluster may be understood as a subset of nodes of a corresponding first cluster from which the second cluster was generated.

In operation 620, the pruning module 260 identifies an entropy threshold. The entropy threshold may indicate a measure of a relation between feature vectors of two or more entities. In some embodiments, the entropy threshold may be used to measure information gain by identifying decreases in uncertainty that results from dividing clusters. In some instances, the pruning module 260 employs Shannon entropy concepts to identify and use the entropy threshold. In some embodiments, the entropy threshold may be a threshold below which a cluster should not be split or two clusters should not be joined.

In operation 630, the pruning module 260 determines a set of entropy values between the set of second clusters originating from a given first cluster. The entropy values may be determined between two cluster feature vectors for a second cluster of the set of second clusters and a first cluster from which the second cluster was derived. In some embodiments, the entropy values may be understood as information gain. For example, the entropy value may be determined using the equation: $H(CFV(p))-H(CFV(c))$, where $CFV(p)$ is the cluster feature vector for the parent (e.g., the first cluster) and $CFV(p)$ is the cluster feature vector for the child (e.g., the second cluster). For example, where the first cluster is comprised of equal numbers of entities associated with two industries, respectively, (e.g., 0.5 and 0.5), the entropy value may be one. Splitting the first cluster into two second clusters, comprising entities associated with only a single industry, may provide entropy values for the two second clusters of zero. Here, the information gain is one bit. In some embodiments, entropy values may be determined between two second clusters derived from the same first cluster.

In operation 640, the pruning module 260 determines whether the entropy threshold exceeds the set of entropy values. The pruning module 260 may determine the entropy threshold exceeds one or more of the set of entropy values by calculating the entropy value for each parent/child set of nodes of the dendrogram and comparing the calculated entropy values with the entropy threshold.

In operation 650, the pruning module 260 threshold determines the entropy threshold exceeds an entropy value of the set of entropy values. Where the value calculated for the entropy threshold is greater than the value calculated for the entropy value, the pruning module 260 may determine the entropy threshold exceeds the entropy value.

In operation 660, the pruning module 260 generates a third cluster of the set of third clusters including the first cluster and the second cluster. The pruning module 260 may generate the third cluster based on the entropy value between the second cluster and the first cluster being less than the entropy threshold. The entropy value being below the entropy threshold may indicate that the second cluster is not sufficiently distinct from the first cluster to warrant separation into a different cluster. Where the entropy value is generated between two second clusters of the set of second clusters which are derived from the same first cluster, the pruning module 260 may combine the two second clusters into a single third cluster. Once the clustering is complete, the clustering machine 22 may have defined a system for identifying communities of topically and geospatially related organizations, referenced above as microindustries.

Figure 7:
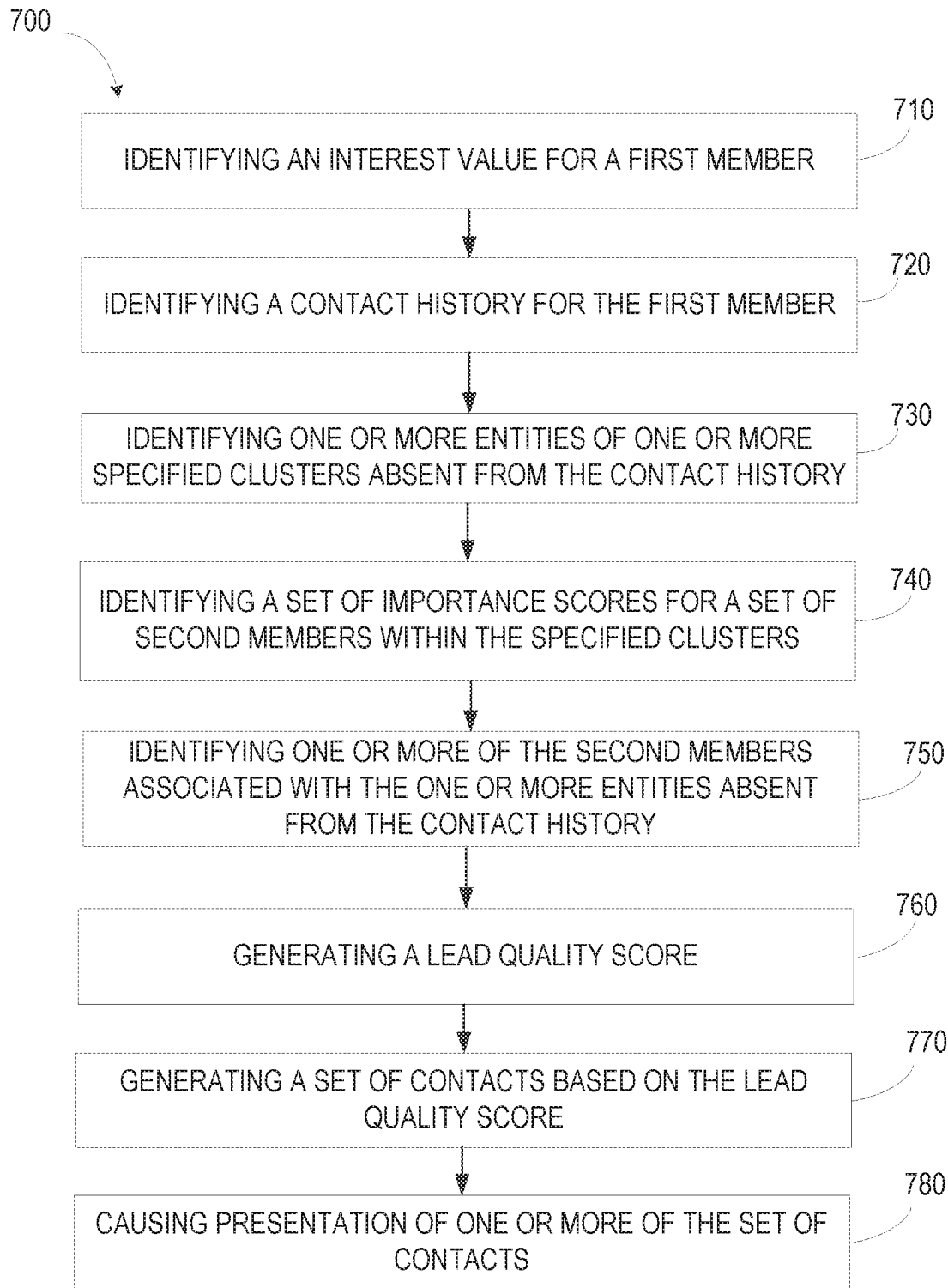
FIG. 7 is a flow diagram illustrating an example method of lead generation and generating tailored notifications and search results based on cluster revision, according to some embodiments of the present disclosure.

FIG. 7 is a flow diagram illustrating an example method 700 of lead generation and generating tailored notifications and search results based on cluster revision, consistent with various embodiments described herein. The method 700 may be performed at least in part by, for example, the clustering machine 22 illustrated in FIG. 2 (or an apparatus having similar modules, such as one or more client machines or application servers). In some embodiments, the method 700 includes one or more operations from the method 300. For example, the operation may be performed in response to completion of the method 300 and the formation of one or more first, second, and third clusters. In some embodiments, the method 700 may be initiated prior to completion of the method 300 and incorporate one or more operations of the method 300 into the performance of the method 700.

In operation 710, the interest module 270 identifies an interest value for a first member. The interest value representing a level of interest of the first member in one or more specified clusters (e.g., one or more second clusters or one or more third clusters). The interest value may be a measure quantifying an extent to which the first member is interested in a cluster, such as a microindustry. In some embodiments, the interest value may be based on entity profiles with which the first member has previously interacted, based on connections or other associations among the first member and members of the social network system 10. The interest module 270 may identify the interest value using an interest vector (e.g., embodied in a cell of a data structure) representing the interest of the first user in the microindustry. The interest value may be defined as a combination of a set of interest factors. The interest factors may include a proportion of page views, leads, connections, and other interactions on the social network system 10 indicating interest. For example, if eighty percent of connections of the first member on the social network system 10 are associated with entities X and Y, both of which are in a single cluster or microindustry, the interest score in that microindustry may be 0.8.

In operation 720, the interest module 270 identifies a contact history for the first member. The contact history representing one or more entities of the one or more specified clusters with which the first member has interacted. The contact history may be identified by the interest module 270 by accessing the user profile of the first member on the database 16. The contact history may include member connections in the social network system 10, messages to other members, and other connections to one or more member of the social network system 10.

In operation 730, based on the contact history, the interest module 270 identifies one or more entities of the one or more specified clusters absent from the contact history and included within the microindustry. The interest module 270 may identify the uncontacted one or more entities by identifying entities represented in the contact history of the first member and comparing the entities of the contact history with entities represented in the microindustries (e.g., a second cluster or a third cluster). The uncontacted one or more entities may be stored in within the profile of the first member.

In operation 740, the importance module 280 identifies a set of importance scores for a set of second members within the one or more specified clusters (e.g., a second cluster or a third cluster). The set of second members each having a level of importance within the one or more specified clusters. The importance score may measure an importance or value of a member within the social network system 10, with respect to a given microindustry. In some embodiments, to identify the importance score, the importance module 280 may define a graph including a set of nodes and edges. The nodes may represent members having user profiles associated with one or more second cluster and one or more third cluster. The edges may extend between nodes of the graph where members represented by the node are connected on the social network system 10. The importance module 280 may apply one or more operations to the graph to identify the importance score for each member represented on the graph. In some embodiments, the importance module 280 may generate the importance score using centrality measures on the graph such as betweenness centrality, a seniority score, or a propensity module. In some embodiments, the importance module 280 may also incorporate interaction statistics from a social network, such as profile views, search queries, and the like, into the importance score.

In operation 750, the interest module 270 identifies one or more of the second members of the set of second members associated with the one or more entities absent from the contact history. The interest module 270 may identify the one or more second members by parsing profiles of the set of second members for whom importance scores were generated to identify associations with one or more of the uncontacted entities. In some embodiments, the interest module 270 may parse the user profiles by parsing one or more database (e.g., the database 16 or the database 18) of the social network system 10. In some embodiments, the interest module 270 may generate a query passed to the social network system 10 to parse the user profiles.

In operation 760, the interest module 270 generates a lead quality score based on the interest value of the first member in the one or more specified clusters and the importance score of the one or more second members. In some embodiments, the lead quality score is generated by calculating a product of a second member's importance score and the interest score of the first member for the microindustry of the second member. The interest module 270 may perform the operation 760 for each second member of the one or more second members identified in the operation 750.

In operation 770, generating a set of contacts based on the lead quality score. The presentation module 290 may generate the set of contacts by populating a query result user interface with a portion of user profiles associated with each of the one or more second members for whom lead quality scores have been generated. In some embodiments, the presentation module 290 generates an order for the one or more second members. The order may be based in part on the lead quality scores of each of the one or more second members.

In operation 780, the presentation module 290 causes presentation of one or more of the set of contacts in an order based on the lead quality score generated in the operation 770. The presentation module 290 may cause presentation of the set of contacts at a client device (e.g., the client device 8). In some embodiments, the presentation module 290 may cause presentation by transmitting the set of contacts via a network (e.g., the internet) to the client device. In some instances, the presentation module 290 may be implemented, at least in part, on the client device. In these situations, the presentation module 290 may directly cause presentation of the set of contacts by rendering the set of contacts through a user interface operating on the client device.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 8 is a block diagram of a machine in the form of a computing device within which a set of instructions, for causing the machine to perform any one or more of the methodologies discussed herein, may be executed. For example, the computing device may be a server functioning as the clustering machine 22. In some instances the computing device may be a set of similar computing devices storing instructions capable of configuring a processor of the computing device as one or more of the modules (hardware-software implemented modules) described above. The configuration of a module, even for a period of time, causes the computing device to act as a special purpose computing device for performing one or more operations associated with the module, as described in the present disclosure. In some embodiments, the computing device may function as the social networking system 10 with portions (e.g., hardware and instructions) partitioned to function as one or more of the modules, interfaces, or systems described above during specified operations associated with those aspects of the modules, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a various embodiments, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a display unit 810, an alphanumeric input device 812 (e.g., a keyboard), and a user interface (UI) navigation device 814 (e.g., a mouse). In one embodiment, the display, input device and cursor control device are a touch screen display. The computer system 800 may additionally include a storage device 816 (e.g., drive unit), a signal generation device 818 (e.g., a speaker), a network interface device 820, and one or more sensors 822, such as a global positioning system sensor, compass, accelerometer, or other sensor.

The drive unit 816 includes a machine-readable medium 824 on which is stored one or more sets of instructions and data structures (e.g., software 826) embodying or utilized by any one or more of the methodologies or functions described herein. The software 826 (e.g. processor executable instructions) may also reside, completely or at least partially, within the main memory 804 (e.g., non-transitory machine-readable storage medium) and/or within the processor 802 during execution thereof by the computer system 800, the main memory 804 and the processor 802 also constituting machine-readable media.

While the machine-readable medium 824 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 826 may further be transmitted or received over a communications network 828 using a transmission medium via the network interface device 820 utilizing any one of a number of well-known transfer protocols (e.g., HTTP). Examples of communication networks include a local area network ("LAN"), a wide area network "WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
performing operations for populating a query result user interface with a portion of a set of user profiles based on lead quality scores associated with the set of user profiles, the operations comprising:
accessing a set of social network data including a set of entity profiles and the set of user profiles, each entity profile being associated with one or more of the set of user profiles;
determining a set of feature vectors for each entity of the set of entity profiles, the set of feature vectors representing an attribute of the associated user profiles;
identifying a set of movement data representing a change of association of one or more users of the set of user profiles from a first entity to a second entity of the set of entity profiles;
generating an entity graph including a set of nodes and a set of edges, each node of the set of nodes representing an entity and the set of edges representing movement data of one or more users changing associations between entities of the set of entities;
generating a set of first clusters in the entity graph, the set of clusters identified based on the set of feature vectors of the set of entity profiles and the movement data;
generating a set of second clusters by partitioning one or more of the first clusters of the set of first clusters;
generating a set of third clusters from the set of second clusters, the set of third clusters combining one or more of the second clusters of the set of second clusters, the third set of clusters representing a set of microindustries;
generating a lead quality score based on an interest value representing an interest of a first user in a microindustry of the set of microindustries and importance score representing an importance of a second user with respect to the microindustry; and
performing the populating of the query result user interface with the portion of the set of user profiles, the populating including listing the second user in an order that is based on the lead quality score.

2. The method of claim 1, wherein determining the set of feature vectors for each entity further comprises:
identifying one or more attributes specified in one or more user profiles of the set of user profiles associated with the entity;
determining a proportion of user profiles including each of the one or more attributes; and
generating a data structure associated with the entity indicating the one or more attributes and a value indicating, for each attribute of the one or more attributes, a proportion of the user profiles associated with the entity including the attribute.

3. The method of claim 1, wherein generating the first set of clusters further comprises:

generating a weight for an edge extending between a first node and a second node based on movement data of the set of movement data between the first node and the second node; and
normalizing the weight for the edge based on movement data associated with one or more edges extending between the first node and a set of neighboring nodes.

4. The method of claim 1, wherein identifying the set of movement data further comprises:
continuously monitoring the set of social network data to identify the change, within one or more user profiles of the set of user profiles, of association from the first entity to the second entity.

5. The method of claim 4, wherein the change of association is a first change of association and further comprising:
in response to a subsequent change of association, generating a subsequent first set of clusters in the entity graph based on the subsequent change of association;
generating a subsequent second set of clusters based on the subsequent first set of clusters; and
generating a subsequent third set of clusters based on the second set of clusters.

6. The method of claim 1, wherein generating the second set of clusters further comprises:
determining a cluster threshold of a specified number of entities for a cluster;
identifying a number of entities within each cluster of the set of first clusters; and
determining whether the number of entities of each cluster of the set of first clusters exceeds the cluster threshold.

7. The method of claim 6; wherein generating the second set of clusters further comprises:
for each entity, identifying an entity feature vector selected from the set of feature vectors;
for each first cluster of the set of first clusters, identifying one or more cluster feature vectors based on proportions of entity feature vectors for the entities included within the set of first clusters; and
segmenting the set of first clusters into the set of second clusters based on the one or more cluster feature vectors of the first clusters of the set of first clusters.

8. The method of claim 1 further comprising:
generating a dendrogram from the set of first clusters and the set of second clusters, the dendrogram identifying one or more clusters of the set of second clusters as subordinate to one or more clusters of the set of first clusters.

9. The method of claim 8, wherein generating the set of third clusters further comprises:
identifying an entropy threshold indicating a measure of a relation between feature vectors of two or more entities;
determining a set of entropy values between the set of entities within the set of second clusters; and
determining whether the set of entropy values exceed the entropy threshold.

10. The system of claim 9 further comprising:
determining an entropy value of the set of entropy values exceeds the entropy threshold; and
generating a cluster of the set of third clusters including entities associated with the entropy value exceeding the entropy threshold.

11. A system, comprising:
one or more processors; and
a non-transitory processor-readable storage medium comprising processor executable instructions that, when executed by the one or more processors, causes the one or more processors to perform operations for populating a query result user interface with a portion of a set of user profiles based on lead quality scores associated with the set of user profiles, the operations comprising:

accessing a set of social network data including a set of entity profiles and the set of user profiles, each entity profile being associated with one or more of the set of user profiles;

determining a set of feature vectors for each entity of the set of entity profiles, the set of feature vectors representing an attribute of the associated user profiles;

identifying a set of movement data representing a change of association of one or more users of the set of user profiles from a first entity to a second entity of the set of entity profiles;

generating an entity graph including a set of nodes and a set of edges, each node of the set of nodes representing an entity and the set of edges representing movement data of one or more users changing associations between entities of the set of entities;

generating a set of first clusters in the entity graph, the set of clusters identified based on the set of feature vectors of the set of entity profiles and the movement data;

generating a set of second clusters by partitioning one or more of the first clusters of the set of first clusters;

generating a set of third clusters from the set of second clusters, the set of third clusters combining one or more of the second clusters of the set of second clusters, the third set of clusters representing a set of microindustries;

generating a lead quality score based on an interest value representing an interest of a first user in a microindustry of the set of microindustries and importance score representing an importance of a second user with respect to the microindustry; and performing the populating of the query result user interface with the portion of the set of user profiles, the populating including listing the second user in an order that is based on the lead quality score.

12. The system of claim 11, wherein determining the set of feature vectors for each entity further comprises:

identifying one or more attributes specified in one or more user profiles of the set of user profiles associated with the entity;

determining a proportion of user profiles including each of the one or more attributes; and generating a data structure associated with the entity indicating the one or more attributes and a value indicating, for each attribute of the one or more attributes, a proportion of the user profiles associated with the entity including the attribute.

13. The system of claim 11, wherein generating the first set of clusters further comprises:

generating a weight for an edge extending between a first node and a second node based on movement data of the set of movement data between the first node and the second node; and normalizing the weight for the edge based on movement data associated with one or more edges extending between the first node and a set of neighboring nodes.

14. The system of claim 11, wherein identifying the set of movement data further comprises:

continuously monitoring the set of social network data to identify the change, within one or more user profiles of the set of user profiles, of association from the first entity to the second entity.

15. The system of claim 14, wherein the change of association is a first change of association and further comprising:

in response to a subsequent change of association, generating a subsequent first set of clusters in the entity graph based on the subsequent change of association;

generating a subsequent second set of clusters based on the subsequent first set of clusters; and generating a subsequent third set of clusters based on the second set of clusters.

16. The system of claim 11, wherein generating the second set of clusters further comprises:

determining a cluster threshold of a specified number of entities for a cluster;

identifying a number of entities within each cluster of the set of first clusters; and determining whether the number of entities of each cluster of the set of first clusters exceeds the cluster threshold.

17. A non-transitory processor-readable storage medium comprising processor executable instructions that, when executed by one or more processors, causes the one or more processors to perform operations for populating a query result user interface with a portion of a set of user profiles based on lead quality scores associated with the set of user profiles, the operations comprising:

accessing a set of social network data including a set of entity profiles and the set of user profiles, each entity profile being associated with one or more of the set of user profiles;

determining a set of feature vectors for each entity of the set of entity profiles, the set of feature vectors representing an attribute of the associated user profiles;

identifying a set of movement data representing a change of association of one or more users of the set of user profiles from a first entity to a second entity of the set of entity profiles;

generating an entity graph including a set of nodes and a set of edges, each node of the set of nodes representing an entity and the set of edges representing movement data of one or more users changing associations between entities of the set of entities;

generating a set of first clusters in the entity graph, the set of clusters identified based on the set of feature vectors of the set of entity profiles and the movement data;

generating a set of second clusters by partitioning one or more of the first clusters of the set of first clusters;

generating a set of third clusters from the set of second clusters, the set of third clusters combining one or more of the second clusters of the set of second clusters, the third set of clusters representing a set of microindustries;

generating a lead quality score based on an interest value representing an interest of a first user in a microindustry of the set of microindustries and importance score representing an importance of a second user with respect to the microindustry; and performing the populating of the query result user interface with the portion of the set of user profiles, the populating including listing the second user in an order that is based on the lead quality score.

18. The non-transitory processor-readable storage medium of claim 17, wherein determining the set of feature vectors for each entity further comprises:

identifying one or more attributes specified in one or more user profiles of the set of user profiles associated with the entity;

determining a proportion of user profiles including each of the one or more attributes; and generating a data structure associated with the entity indicating the one or more attributes and a value indicating, for each attribute of the one or more attributes, a proportion of the user profiles associated with the entity including the attribute.

19. The non-transitory processor-readable storage medium of claim 17, wherein generating the first set of clusters further comprises:

generating a weight for an edge extending between a first node and a second node based on movement data of the set of movement data between the first node and the second node; and normalizing the weight for the edge based on movement data associated with one or more edges extending between the first node and a set of neighboring nodes.

20. The non-transitory processor-readable storage medium of claim 19, wherein identifying the set of movement data further comprises:

continuously monitoring the set of social network data to identify the change, within one or more user profiles of the set of user profiles, of association from the first entity to the second entity, the change of association being a first change of association;

in response to a subsequent change of association, generating a subsequent first set of clusters in the entity graph based on the subsequent change of association;

generating a subsequent second set of clusters based on the subsequent first set of clusters; and generating a subsequent third set of clusters based on the second set of clusters.

* * * * *

UNITED STATES PATENT AND TRADEMARK OFFICE
CERTIFICATE OF CORRECTION

PATENT NO. : 10,592,535 B2  
APPLICATION NO. : 15/229956  
DATED : March 17, 2020  
INVENTOR(S) : Ahn et al.

Page 1 of 1

It is certified that error appears in the above-identified patent and that said Letters Patent is hereby corrected as shown below:

In the Claims

In Column 20, Line 32, in Claim 7, delete "claim 6;" and insert --claim 6,-- therefor Signed and Sealed this
Twenty-ninth Day of September, 2020

Andrei Iancu
*Director of the United States Patent and Trademark Office*